United States Patent
Ko et al.

(10) Patent No.: US 6,932,153 B2
(45) Date of Patent: Aug. 23, 2005

(54) HEAT EXCHANGER

(75) Inventors: Cheol-Soo Ko, Gunpo (KR); Se-Yoon Oh, Seoul (KR); Sai-Kee Oh, Seoul (KR); Yong-Cheol Sa, Anyang (KR); Dong-Yeon Jang, Siheung (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 10/337,276

(22) Filed: Jan. 7, 2003

(65) Prior Publication Data

US 2004/0035559 A1 Feb. 26, 2004

(30) Foreign Application Priority Data

Aug. 22, 2002 (KR) .............................. 10-2002-0049856

(51) Int. Cl.$^7$ ............................................... F28D 1/04
(52) U.S. Cl. ........................ 165/110; 165/152; 165/153; 62/515
(58) Field of Search ................................ 165/152, 153, 165/110, 111; 62/515

(56) References Cited

U.S. PATENT DOCUMENTS 2,647,731 A * 8/1953 Ludlow ...................... 165/152

FOREIGN PATENT DOCUMENTS

| GB | 2027533 A | * | 2/1980 | ................. 165/153 |
|---|---|---|---|---|
| JP | 55110892 A | * | 8/1980 | ................. 165/153 |
| JP | 56130594 A | * | 10/1981 | ................. 165/151 |
| JP | 56130595 A | * | 10/1981 | ................. 165/151 |
| JP | 58045495 A | * | 3/1983 | ................. 165/152 |
| JP | 07190661 A | * | 7/1995 | |
| JP | 11083371 A | * | 3/1999 | |
| JP | 2000028228 A | * | 1/2000 | |
| KR | 2000-31340 | | 6/2000 | |

* cited by examiner

*Primary Examiner*—Leonard R. Leo
(74) *Attorney, Agent, or Firm*—Birch, Stewart, Kolasch & Birch, LLP

(57) ABSTRACT

A heat exchanger includes: a receiving tube into which a fluid is introduced; a discharge tube for discharging a heat-exchanged fluid outwardly; a plurality of fins disposed between the receiving tube and the discharge tube, being bent at regular intervals so that air can pass at an outer circumferential surface thereof, and having a guide unit for guiding condensate water condensed at the surface thereof in one direction; and a tube disposed between the fins for heat-exchanging between a fluid passing therethrough and air passing the outer circumferential surface of the fin, and having a condensate water discharge path for discharging downwardly the condensate water guided by the guide unit. A condensate water remaining phenomenon between the fins can be reduced, and thus, the heat exchanging performance is improved.

6 Claims, 4 Drawing Sheets

HEAT EXCHANGER

BACKGROUND OF THE INVENTION

1. Field of the Invention

The present invention relates to a heat exchanger and, more particularly, to a heat exchanger that is capable of smoothly discharging condensate water condensed at a tube and a fin of a heat exchanger.

2. Description of the Background Art

In general, a heat exchanger, a device for heat-exchanging by making two different fluids to contact each other directly or indirectly, is used for a heater, a cooler, an evaporator and a condenser in an industrial field of heating, air-conditioning, driving force generation, waste heat recovery and a chemical process.

Especially, in the heat exchanger used for air-conditioning, when air containing moisture passes through a fin for heat exchange, heat exchanging is performed with a refrigerant being supplied to a tube.

That is, in the heat exchanger, when air containing moisture passes through the fin, which has an enlarged surface to heighten its contact with air and improve heat transmission, heat is exchanged owing to the refrigerant of a low temperature being supplied into the tube.

FIG. 1 is a perspective view of a heat exchanger in accordance with a conventional art.

As shown in FIG. 1, the conventional heat exchanger includes: a cylindrical receiving tube 101 into which a fluid is introduced there; a plurality of tubes 102 connected to the cylindrical receiving tube 101 at regular intervals in a longitudinal direction and heat-exchanging as the fluid passes thereon; a plurality of fins 110 formed in a longitudinal direction between the tubes and improving a heat transmission performance by enlarging an air contact area; and a cylindrical discharge tube 103 connected to the other end portion of the plurality of tubes 102, and collecting and discharging the fluid which has finished the heat exchanging operation.

FIG. 2 is an enlarged perspective view showing a portion of the heat exchanger of FIG. 1.

As illustrated, the fin 110 is attached bent at one side of each tube 102. A plurality of bent plane parts 112 are arranged at regular intervals at the opposite side thereof. Louvers 113 are provided on the plane part 112 which are successively bent to make a certain angle to heighten an insulation area.

FIG. 3 is a sectional view taken along line 11—11 of FIG. 2, which shows one embodiment of the plane part 112 of the fin 110, as the plane part 112 is louver-shaped.

The louver 113 is formed cut with a certain width centering around a central portion of the plane part 112, including central louvers 113a formed to have a certain angle in a gravity direction, not allowing condensate water to be collected thereon, and side louvers 113b formed inclined upwardly and downwardly in a symmetrical manner centering around the central louvers 113a.

In the conventional heat exchanger, the louver 113 is formed in shaping the plane part of the fin 110 of the conventional heat exchanger. But in a different embodiment, a plurality of slits in a rectangular shape can be formed at regular intervals.

In the conventional heat exchanger constructed as described above, the fluid introduced into the receiving tube 101 is distributed to the tube 102, passes through the tubes 102, is collected into the discharge tube 103 and then discharged outwardly. At this time, as the fluid passing through the tubes 102 and the air passing between the fins 110 installed between the tubes 102 in the longitudinal direction interact, heat exchanging is performed.

When the heat exchanger performs the heat exchanging operation, condensate water is formed at the surface of the tube 102 and the fin 110. Arrows in FIG. 3 show how condensate water is discharged through the louvers. At this time, the condensate water formed at the surface of the tubes 102 and the fins 110 causes generation of air flow resistance in the heat exchanging, degrading the heat exchanging performance.

In addition, since the condensate water condensed at the fins 110 and the tubes 102 is discharged downwardly through the louvers 113 formed at the plane parts 112 of the fins 110, the condensate water discharge time is lengthened, resulting in degradation of the performance of the heat exchanger.

SUMMARY OF THE INVENTION

Therefore, an object of the present invention is to provide a heat exchanger that is capable of ensuring a smooth air flow and improving a heat exchanging performance by enhancing a structure of a fin and a tube so as to rapidly discharge condensate water formed at a surface of the fin and the tube and prevent a condensate water from remaining thereon.

To achieve these and other advantages and in accordance with the purpose of the present invention, as embodied and broadly described herein, there is provided a heat exchanger including: a receiving tube into which a fluid is introduced, a discharge tube for discharging a heat-exchanged fluid outwardly; a plurality of fins disposed between the receiving tube and the discharge tube, being bent at regular intervals so that air can pass at an outer circumferential surface thereof, and having a guide unit for guiding condensate water condensed at the surface thereof in one direction; and a tube disposed between the fins, allowing air passing the outer circumferential surface of the fin to be heat-exchanged with a fluid passing therethrough, and having a condensate water discharge path for discharging downwardly the condensate water guided by the guide unit.

In the heat exchanger of the present invention, a plane part of the fin includes a first base portion with a louver thereon and a second base portion formed plane.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
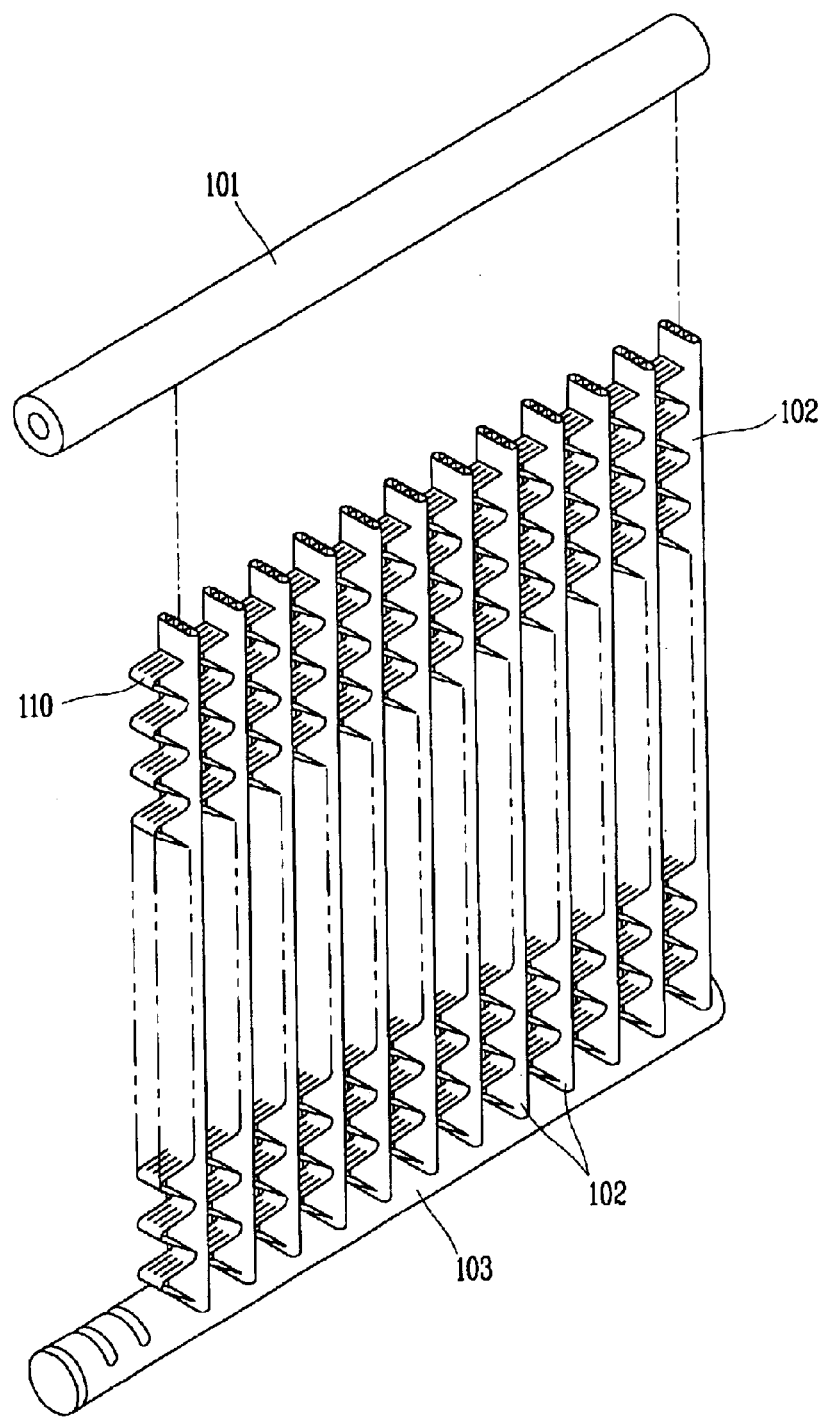
FIG. 1 is a perspective view showing a heat exchanger in accordance with a conventional art.
Figure 2:
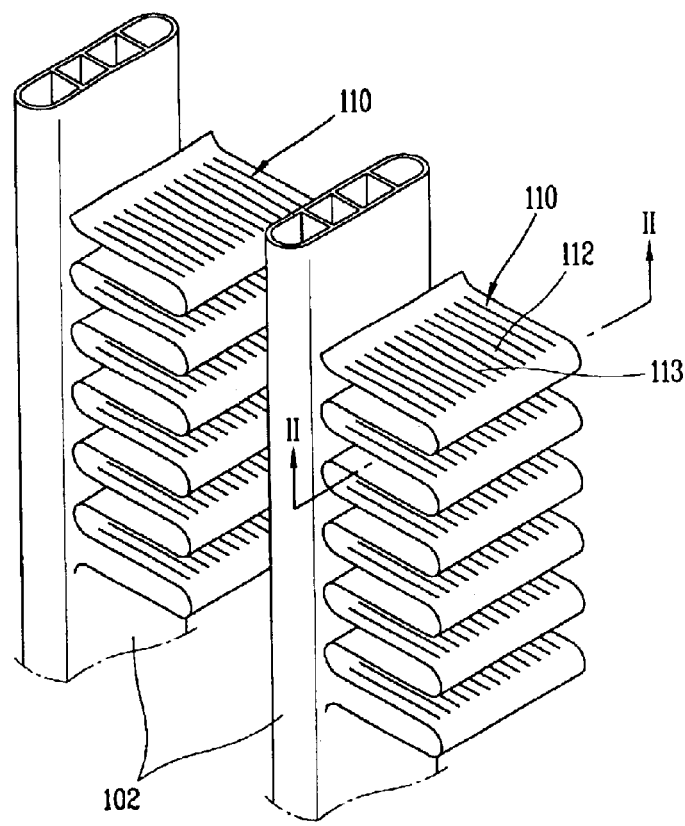
FIG. 2 is a partial perspective view showing an enlarged one portion of the heat exchanger of FIG. 1.
Figure 3:
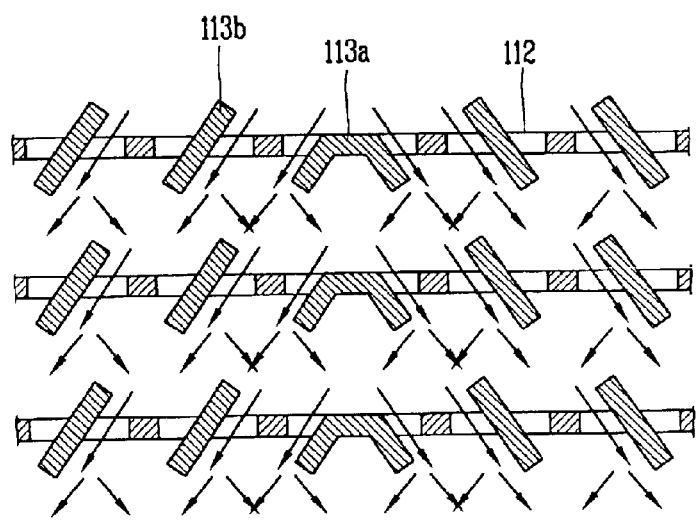
FIG. 3 is a sectional view taken along line 11—11 of FIG. 2.
Figure 4:
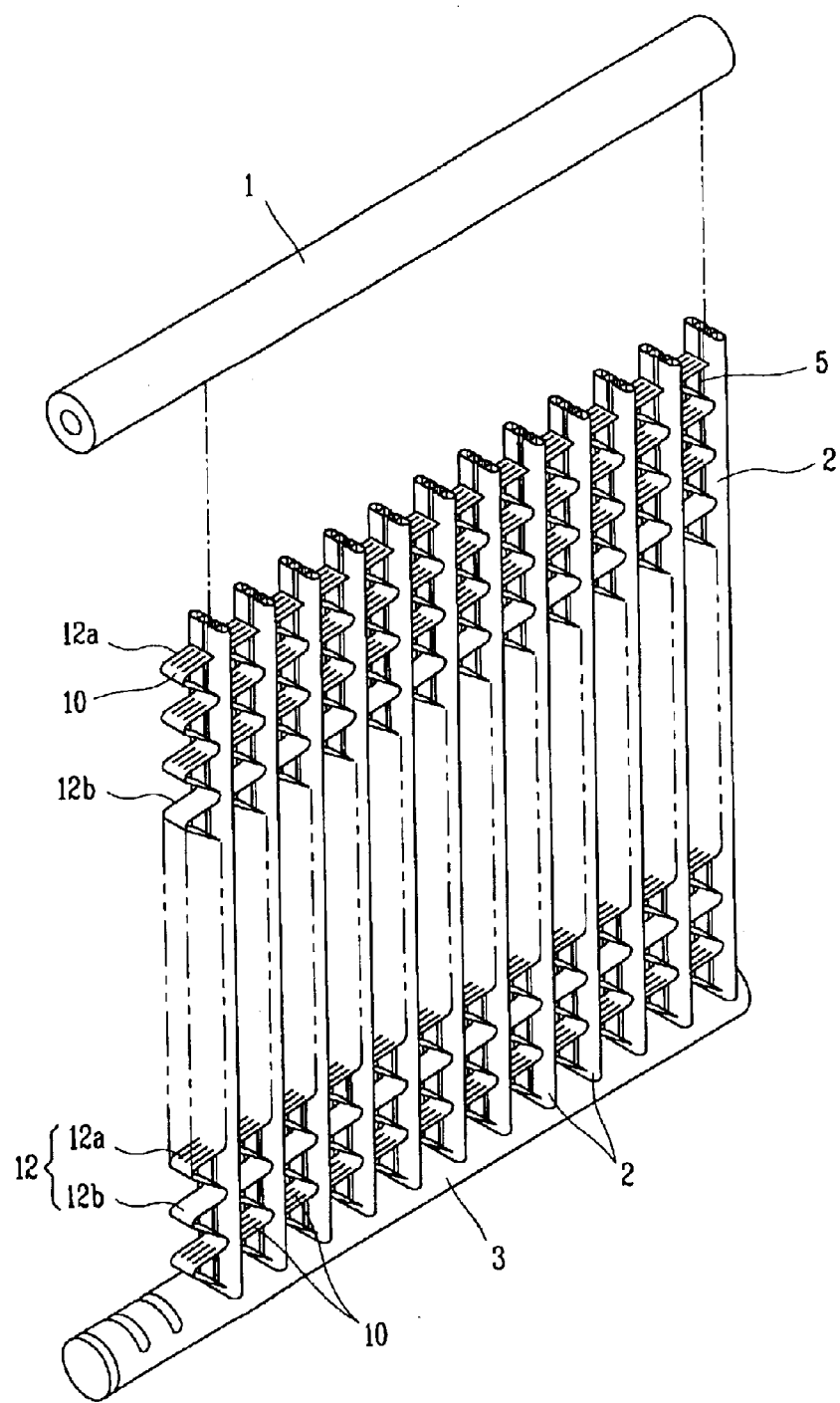
FIG. 4 is a perspective view of a heat exchanger in accordance with the present invention.
Figure 5:
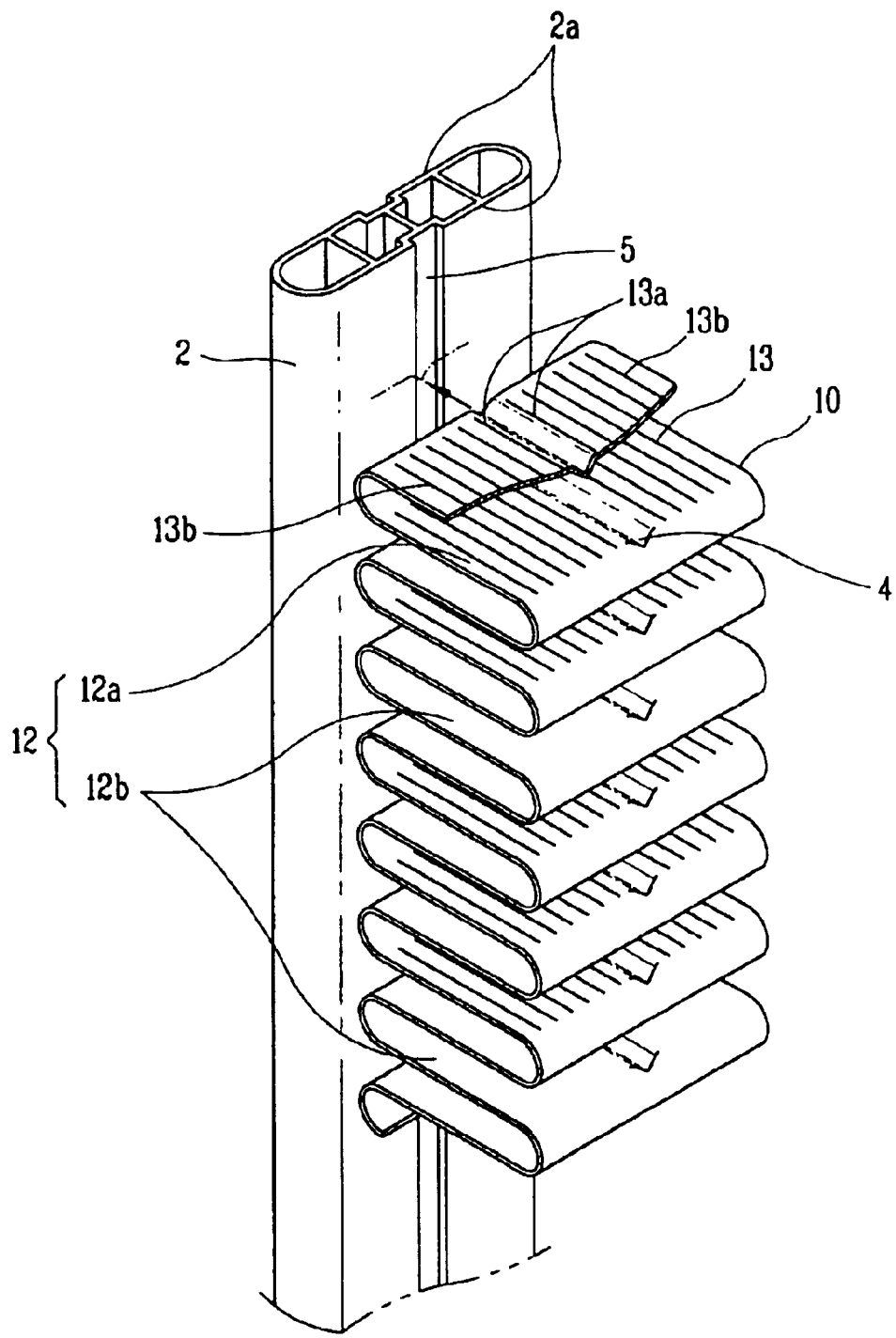
FIG. 5 is a partial perspective view showing an enlarged one portion of the heat exchanger of FIG. 4.

FIG. 4 is a perspective view of a heat exchanger in accordance with the present invention; and FIG. 5 is a partial perspective view showing an enlarged one portion of the heat exchanger of FIG. 4.

As illustrated, a heat exchanger includes of the present invention includes: a receiving tube 1 into which a fluid is introduced, a discharge tube 3 for discharging a heat-exchanged fluid outwardly; a plurality of fins 10 disposed between the receiving tube 1 and the discharge tube 3, being bent at regular intervals so that air can pass at an outer circumferential surface thereof, and having a guide unit for guiding condensate water condensed at the surface thereof in one direction; and a tube disposed between the fins 10 for heat-exchanging between a fluid passing therethrough and air passing the outer circumferential surface of the fin 10, and having a condensate water discharge path 5 for discharging downwardly the condensate water guided by the guide unit.

The receiving tube 1 and the discharge tube 3 are formed in a cylindrical shape with a certain length and connected to both end portions of the plurality of tubes 2 formed at regular intervals in a longitudinal direction, into which the fluid can flow.

The fins 10 are disposed in a longitudinal direction between the receiving tube 1 and the discharge tube 3 and arranged bent at regular intervals so that air can pass an outer circumferential surface thereof.

The fins 10 include a first base portion 12a bent at regular intervals and having a louver-shaped central louver 13a and a side louver 13b, and a second base portion 12b bent at regular intervals like the first base portion and formed plane without having a hole such as the louver 13 or a slit.

The central louver 13a of the first base portion is formed cut with a certain width to be symmetrical with respect to the left and right side centering around the center of the plane part 12 and inclined at a certain angle at left and right sides centering around the center so that condensate water may not be formed at the central portion of the base portion 12.

The side louver 13b is formed inclined at a certain angle upwardly and downwardly to make a symmetrical form at the left and right sides centering around the central louver 13b.

The second base portion 12b is repeatedly formed with a certain cycle for the first base portion 12a, or repeatedly formed at regular intervals irrespective of a certain cycle.

The plane part 12 of the fin includes a guiding unit for guiding condensate water in one direction of the tube 2.

As the guiding unit of the fins 10, a condensate water guiding groove 4 can be formed provided in a longitudinal direction of the tube 2 at the first base portion 12a and the second base portion 12b arranged bent at regular intervals at the fins 10.

The plane part 12 is formed inclined toward the condensate water guiding groove 4.

At this time, the condensate water guiding groove 4 can be formed either at the second base portion 12b or at the first base portion 12a of the plane part 12 of the fin 10.

The first base portion may have a rectangular slit instead of the louver 13 likewise in the conventional art, so that condensate water can be moved downwardly.

The tubes 2 include a condensate water discharge path 5 to discharge condensate water downwardly. The condensate water discharge path 5 is connected to the condensate water guiding unit of the fin 10 and formed in a longitudinal direction of the tubes 2.

The condensate water discharge path 5 is formed concave with a certain depth and width at both sides 2a of the tube and extended in a longitudinal direction.

The operation of the heat exchanger in accordance with the preferred embodiment of the present invention will now be described.

When a fluid is introduced into the receiving tube 1, the fluid is distributed to each tube 2. The fluid passing through the tube 2 is heat-exchanged with an external air flowing by being in contact with the outer circumferential surface of the fin 10. The heat-exchanged fluid after passing through the tube 2 is introduced into the discharge tube 3 and moved outwardly of the heat exchanger.

While the heat exchanger is being operated, if condensate water is formed at the tubes 2 and the fins 10, the condensate water is condensed at the first or the second base portions 12 of the fin, guided to the condensate water guiding groove 4 and quickly flows into the tubes 2. The introduced condensate water and the condensate water generated at the surface of the tube 2 flow to the condensate water discharge path 5 formed at both sides of the tube 2a and then rapidly discharge downwardly by gravity.

As so far described, the heat exchanger of the present invention has the following advantages.

While the heat exchanger operates, condensate water condensed at the surface of the tubes and the fins is rapidly discharged downwardly through the condensate water discharge path formed at the center of both sides of the tube. Therefore, a condensate water remaining phenomenon between the fins can be reduced, and thus, the heat exchanging performance is improved.

In addition, since the condensate water formed at the outer circumferential surface of the fins is rapidly discharge toward the tube with the condensate water discharge path by the condensate water guiding groove formed at the first or the second base portions of the fin, the condensate water discharging time can be shortened.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A heat exchanger comprises:
   a receiving tube into which a fluid is introduced;
   a discharge tube for discharging a heat-exchanged fluid outwardly;
   a plurality of fins disposed between the receiving tube and the discharge tube, being bent at regular intervals so that air can pass at an outer circumferential surface thereof, and having a guide unit for guiding condensate water condensed at the surface thereof in one direction; and a tube disposed between the fins for heat-exchanging between a fluid passing therethrough and air passing the outer circumferential surface of the fin, and having a condensate water discharge path for discharging downwardly the condensate water guided by the guide unit;

wherein the guiding unit is a condensate water guiding groove formed in a longitudinal direction toward the tube at a plane part of the pin fin arranged bent at regular intervals.

2. The heat exchanger of claim 1, wherein the plane part is formed inclined toward the condensate water guiding groove.

3. The heat exchanger of claim 1, wherein the plane part comprises:

a first base portion with a louver; and a second base portion formed plane around the condensate water guiding groove.

4. The heat exchanger of claim 3, wherein the first base portion and second base portion are disposed with certain cycles.

5. The heat exchanger of claim 1, wherein the condensate water discharge path is connected to the condensate water guiding groove and formed in a longitudinal direction of the tube.

6. The heat exchanger of claim 5, wherein the condensate water discharge path is formed concave with a certain width at both sides of the tube.

* * * * *